United States Patent
Morimoto et al.

(10) Patent No.: US 11,892,733 B2
(45) Date of Patent: Feb. 6, 2024

(54) LIQUID CRYSTAL DISPLAY DEVICE

(71) Applicant: Japan Display Inc., Tokyo (JP)

(72) Inventors: Masateru Morimoto, Tokyo (JP); Satoru Kawasaki, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 18/173,066

(22) Filed: Feb. 23, 2023

(65) Prior Publication Data
US 2023/0305344 A1 Sep. 28, 2023

(30) Foreign Application Priority Data
Mar. 24, 2022 (JP) ................ 2022-048116

(51) Int. Cl.
*G02F 1/1335* (2006.01)
*G02F 1/1343* (2006.01)
*G02F 1/1362* (2006.01)

(52) U.S. Cl.
CPC .... *G02F 1/13439* (2013.01); *G02F 1/134372* (2021.01); *G02F 1/136286* (2013.01)

(58) Field of Classification Search
CPC .................................. G02F 1/1335
See application file for complete search history.

(56) References Cited

U.S. PATENT DOCUMENTS

| | | | |
|---|---|---|---|
| 2017/0090257 A1* | 3/2017 | Shimura | G02F 1/136227 |
| 2018/0059486 A1* | 3/2018 | Matsushima | G02F 1/133512 |
| 2019/0258122 A1* | 8/2019 | Sogabe | G02F 1/136227 |
| 2023/0253441 A1* | 8/2023 | Yee | H01L 33/24 |
| | | | 257/89 |

FOREIGN PATENT DOCUMENTS

| | | |
|---|---|---|
| JP | 2019-144315 A | 8/2019 |
| JP | 6772001 B2 | 10/2020 |

* cited by examiner

*Primary Examiner* — Sang V Nguyen
(74) *Attorney, Agent, or Firm* — XSENSUS LLP

(57) ABSTRACT

Purpose is to realize a display device of high definition and high response speed. The structure is as follows. A liquid crystal display device including: scanning lines extending in a first direction and being arranged in a second direction, video signal lines extending in the second direction and being arranged in the first direction, and a pixel being surrounded by the scanning lines and the video signal lines, in which a pixel electrode is formed in the pixel, the pixel electrode includes a first portion including comb electrode, a second portion including contact portion to receive electrical signal, and a third portion, the third portion protrudes toward an adjacent pixel electrode compared with the first portion and the second portion, and a normal of a side toward the adjacent pixel electrode of the third portion intersects with the first direction and the second direction with an angle other than 0 and 90 degrees.

13 Claims, 14 Drawing Sheets

LIQUID CRYSTAL DISPLAY DEVICE

CROSS-REFERENCE TO RELATED APPLICATION

The present application claims priority from Japanese Patent Application JP 2022-048116 filed on Mar. 24, 2022, the content of which is hereby incorporated by reference into this application.

BACKGROUND OF THE INVENTION

(1) Field of the Invention

The present invention relates to a liquid crystal display device which is capable of high definition and a high response speed.

(2) Description of the Related Art

A liquid crystal display device has a problem in viewing angle; however, an IPS (In Plane Switching) mode has a superior viewing angle characteristic and, thus, it is widely used. Among IPS mode LCDs (Liquid Crystal Displays), FFS (Fringe Filed Switching) mode has relatively high transparency in pixels, thus, it is widely used. Liquid crystal displays are expanding their applications in various fields.

Some display devices require high definition and high response speed. Patent document 1 discloses a structure of pixels which enables high response speed in the display device. Patent document 2 discloses a structure of electrodes and wirings which enables high definition displays in IPS mode or FFS mode display.

Patent document 1: Japanese patent No. 6772001
Patent document 2: Japanese patent application laid open No. 2019-144315

SUMMARY OF THE INVENTION

The liquid crystal display devices which are used in VR (Virtual Reality) display device are required to have high definition and high response speed characteristics. The liquid crystal controls transparency of light by rotating the liquid crystal molecules through electric field; while the liquid crystal can be thought as an elastic body, therefore, the liquid crystal molecules are influenced by surrounding liquid crystal molecules even in a same pixel. As a result, a response speed of the liquid crystal molecules is influenced by alignment directions of surrounding liquid crystal molecules.

Liquid crystal display devices form images by controlling the liquid crystal molecules through fields in a pixel formed between the pixel electrode and the common electrode. However, in the high definition display devices, a distance between the adjacent pixels become small; thus, an influence to the liquid crystal molecules from the pixel electrode of the adjacent pixel becomes not being neglected. This phenomenon not only lowers contrast of the images and but also influences rotation speed of the liquid crystal molecules, namely response speed of the liquid crystal.

The purpose of the present invention is to solve the above explained problems and to realize a liquid crystal display device of high definition and high response speed.

The present invention solves the above explained problems; the representative structures are as follows.

(1) A liquid crystal display device including: scanning lines extending in a first direction and being arranged in a second direction, video signal lines extending in the second direction and being arranged in the first direction, and a pixel being surrounded by the scanning lines and the video signal lines, in which a pixel electrode is formed in the pixel, the pixel electrode includes a first portion including comb electrode, a second portion including contact portion to receive electrical signal, and a third portion, the third portion protrudes toward an adjacent pixel electrode compared with the first portion and the second portion, and a normal of a side toward the adjacent pixel electrode of the third portion intersects with the first direction and the second direction with an angle other than 0 and 90 degrees.

(2) The liquid crystal display device according to claim 1, in which the side toward the adjacent pixel electrode of the third portion is a curved line.

(3) The liquid crystal display device according to claim 1, in which the normal of the side toward the adjacent pixel electrode of the third portion intersects with the first direction and the second direction with an angle of 30 degrees or more.

(4) The liquid crystal display device according to claim 1, in which a metal film applied with a common voltage extends in the second direction overlapping the video signal line, and a width of the metal film in the first direction is larger than a width of the video signal line in the first direction.

DETAILED DESCRIPTION OF THE PREFERRED EMBODIMENTS

The present invention is explained in detail by the following embodiments.

Embodiment 1

Figure 1:
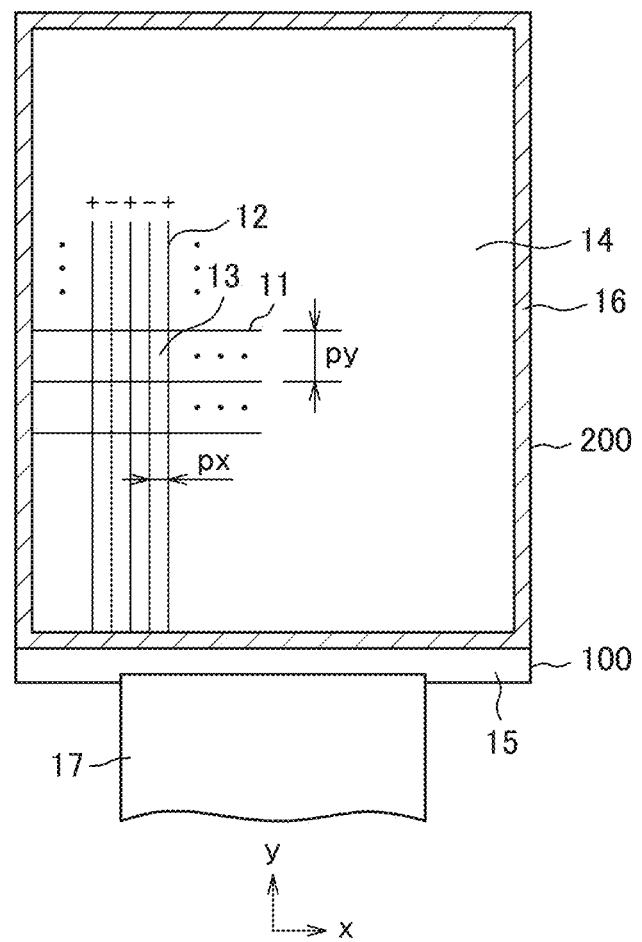
FIG. 1 is a plan view of a liquid crystal display device.

FIG. 1 is a plan view of the liquid crystal display device to which the present invention is applied. In FIG. 1, a TFT substrate 100 and a counter substrate 200 are adhered to each other with seal material 16; a liquid crystal layer is sandwiched between the TFT substrate 100 and the counter substrate 200. A display area 14 is formed in an area in which the TFT substrate 100 and the counter substrate 200 overlap each other.

In the display area 14 of the TFT substrate 100, scanning lines 11 extend in the lateral direction (the x axis direction) and are arranged in the longitudinal direction (the y axis direction); video signal lines 12 extend in the longitudinal direction (the y axis direction) and are arranged in the lateral direction. An area surrounded by the scanning lines 11 and the video signal lines 12 is a pixel 13. By the way, such structure of the pixel is sometimes called as the sub-pixel, however, it is called as the pixel in this specification.

The pixel in this embodiment is very small as: a pitch in the lateral direction is 11 μm, a pitch in the longitudinal direction is 33 μm. When a distance between the adjacent pixels becomes so small, interference between the adjacent pixels becomes a problem. In the liquid crystal display device, a polarity of the pixel electrode and a polarity of the common electrode are regularly interchanged to avoid electrolysis of the liquid crystal material. To further securely avoid the electrolysis, so called row inversion drive, column inversion drive, dot inversion drive and so forth are developed.

In the present embodiment, column inversion drive is adopted as shown in FIG. 1. That is to say, a voltage of reverse polarity is applied to the adjacent video signal lines, and the polarity is alternatively interchanged. In the liquid crystal display device, the liquid crystal molecules are driven by a voltage difference between the pixel electrode and the common electrode. On the other hand, in the column inversion drive, as shown in FIG. 1, a voltage difference between the adjacent pixels is a twice of a voltage difference between the pixel electrode and the common electrode in one pixel.

Although a distance between the common electrode and the pixel electrode is 70 to 100 nm, a distance between the adjacent pixel electrodes is 1 μm or more, thus, a voltage between the pixel electrode and the common electrode is predominant to drive the liquid crystal molecules; however, when a distance between the pixel electrodes becomes smaller, an interference between the adjacent pixel electrodes becomes not being neglected.

In FIG. 1, the TFT substrate 100 is made larger than the counter substrate 200; an area of the TFT substrate 100 which does not overlap with the counter substrate 200 is a terminal area 15. A flexible wiring substrate 17 is connected to the terminal area 15. A driver IC which drives the liquid crystal display device is installed in the flexible wiring substrate 17. The driver IC, however, can be installed in the terminal area 15.

Since the liquid crystal is not self-luminous, a back light is disposed at a rear side of the TFT substrate 100. The liquid crystal display panel forms images by controlling a transmission of light from the back light in individual pixels. The flexible wiring substrate 17 is bent back to the rear side of the back light, thus, an outer size of the liquid crystal display device is made smaller.

Figure 2:
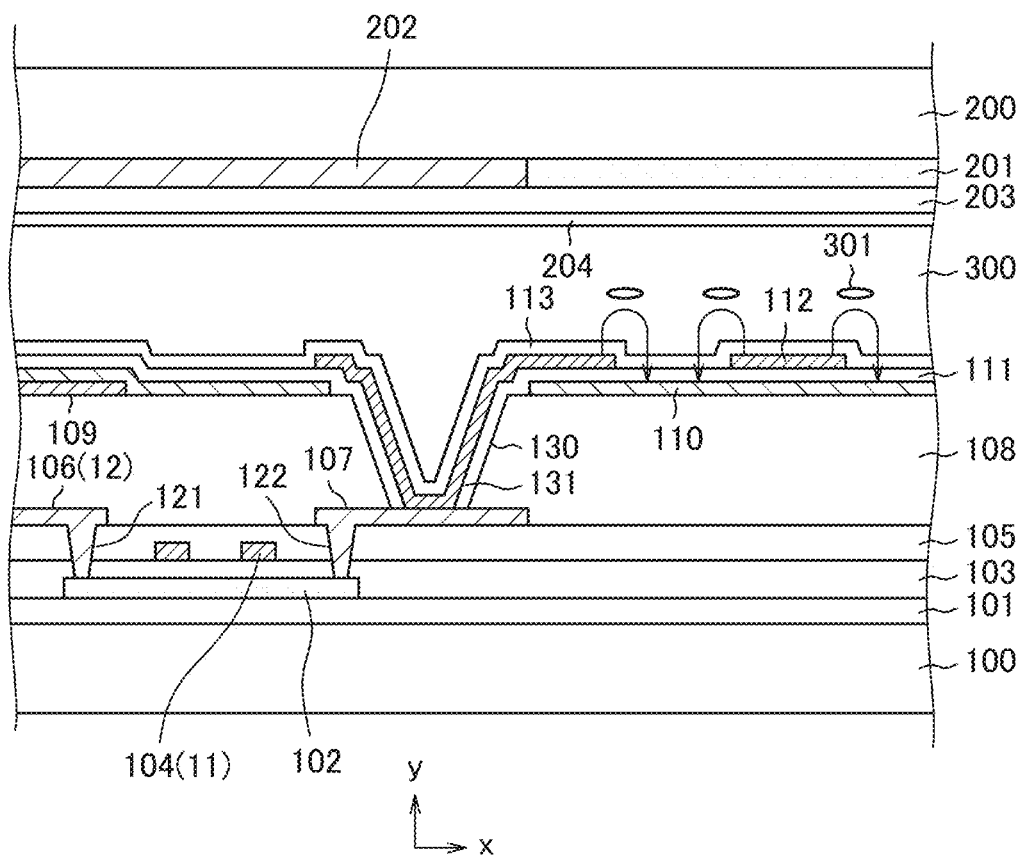
FIG. 2 is a cross sectional view of display area of the liquid crystal display device.

FIG. 2 is a cross sectional view of the display area 14, in which pixels exist. FIG. 2 is a liquid crystal display device which is a FFS (Fringe Field Switching) mode belonging to the IPS (In Plane Switching) mode. FIG. 2 is a main cross sectional structure to form images, and does not include all the elements which feature the structure of embodiment 1.

In FIG. 2, an under coat film 101 is formed covering the TFT substrate 100. The under coat film 101 prevents the oxide semiconductor film 102 from being contaminated by impurities from the substrate 100, which is made of glass or resin as polyimide. The under coat film 101 is formed from laminated structure of a silicon oxide (SiO) film and a silicon nitride (SiN) film in many cases.

A semiconductor film 102, which forms a TFT, is formed on the under coat film 101. The semiconductor film 102 is e.g. a poly-silicon oxide film 102. The poly-silicon oxide film 102 is formed as that, an amorphous silicon film is formed by CVD and the amorphous silicon film is converted to the poly-silicon film by excimer laser. The poly-silicon semiconductor is called herein after simply as the semiconductor film 102. In the meantime, the semiconductor film 102 can adopt not only the poly silicon but also amorphous silicon or oxide semiconductor.

Figure 3:
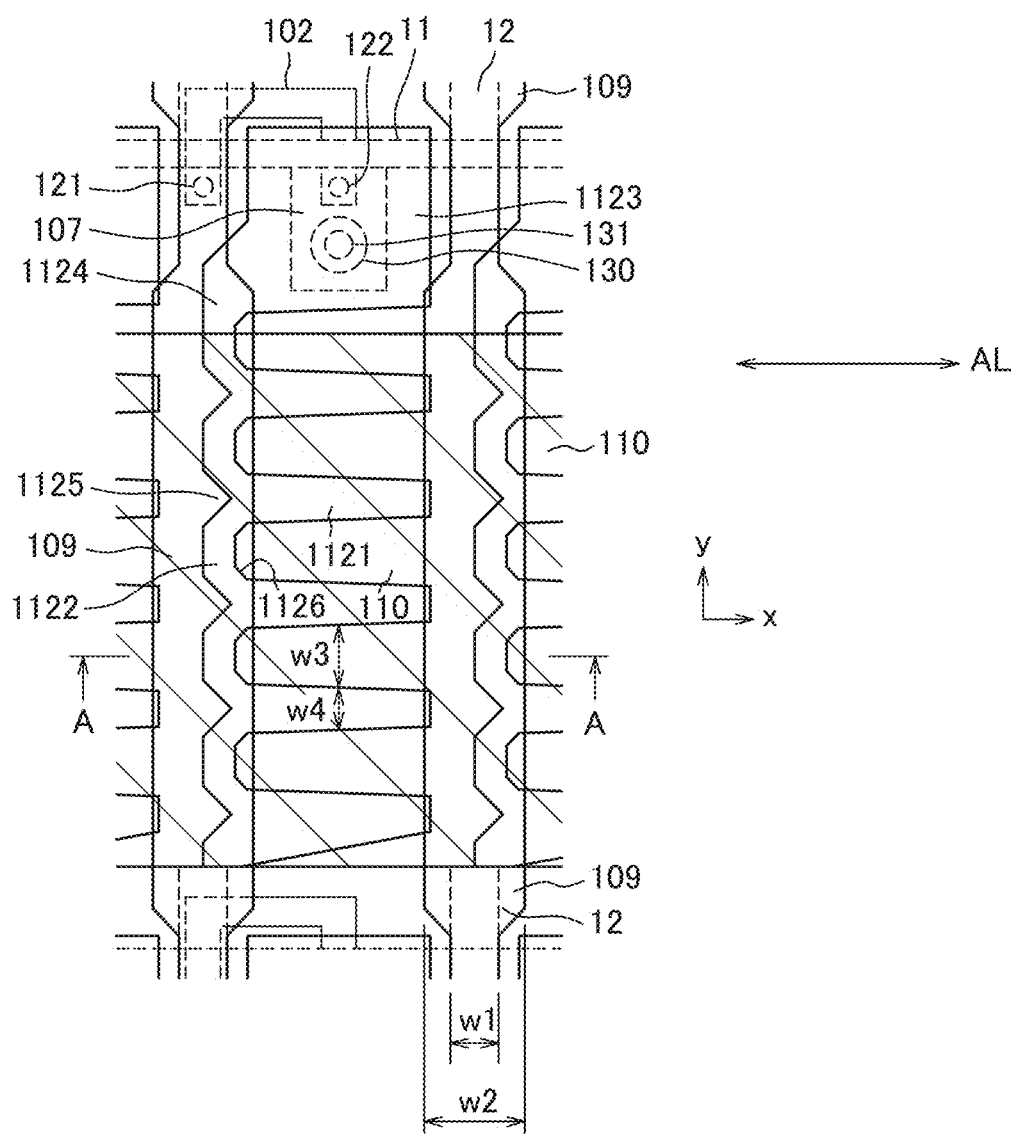
FIG. 3 is a plan view of a pixel according to a comparative example.

A gate insulating film 103 is formed from silicon oxide (SiO) or silicon nitride (SiN) covering the semiconductor film 102. Tow gate electrodes 104 are formed in series on the gate insulating film 103. As shown in FIG. 3, the scanning line 11 is used as the gate electrode 104. As a result, two TFTs are formed in series by that the semiconductor film 102 passes under twice the scanning line 11 via the gate insulating film 103.

In FIG. 2, an interlayer insulating film 105 is formed covering the gate electrode 104 and the gate insulating film 103; the interlayer insulating film 105 is formed from silicon oxide (SiO) film, silicon nitride (SiN) film, or both of them. After that, a through hole 121 is formed in the interlayer insulating film 105 and the gate insulating film 103 to connect one end of the semiconductor film 102 with the video signal line 12. In FIG. 2, the video signal line 12 is used as the drain electrode 106. Further, a through hole 122 is formed in the interlayer insulating film 105 and the gate insulating film 103 to connect another end of the semiconductor film 102 with the source electrode 107. The source electrode 107 extends in a direction to the pixel electrode 112.

An organic passivation film 108 is formed covering the drain electrode 106, the source electrode 107, the interlayer insulting film 105; the organic passivation film 108 is formed from transparent resin, as e.g. acrylic resin. The organic passivation film 108 is used as a flattening film and is used to decrease a coupling capacitance between the common electrode 110 formed on the top side of the organic passivation film 108 and the video signal line 12 or the scanning line 11 formed bottom side of the organic passivation film 108. Therefore, the organic passivation film 108 is made as thick as 2 μm or more.

In the meantime, in FIG. 2, the TFT, which is constituted from the semiconductor film 102, the gate electrode 104, the drain electrode 106, the source electrode 107, is a top gate type. However, the TFT is not limited to the top gate type but the TFT can be a bottom gate type, in which the gate electrode is formed between the semiconductor film 102 and the TFT substrate 100. Further, the TFT can be a combination of the top gate type and the bottom gate type, in which the semiconductor film 102 is sandwiched between the top gate electrode and the bottom gate electrode in a cross sectional view.

In FIG. 2, the common electrode 110 is formed from a transparent conductive film as e.g. ITO (Indium Tin Oxide) on the organic passivation film 108. A capacitance insulating film 111, which is formed from SiN, covers the common electrode 110. The capacitance insulating film 111 is made thin as e.g. 70 nm to increase a pixel capacitance. A pixel electrode 112 is formed from a transparent conductive film as e.g. ITO on the capacitance insulating film 111.

A through hole 130 is formed in the organic passivation film 108 at a place corresponding to the source electrode 107; a through hole 131 is formed in the capacitance insulating film 111 in the through hole 130. Thus, the pixel electrode 112 and the source electrode 107 are connected to each other. An alignment film 113 is formed from polyimide covering the pixel electrode 112. There are a rubbing method and a so called optical alignment method, which uses polarized ultra violet ray, in alignment method of the alignment film 113. Since IPS mode (including FFS mode) does not need a tilting angle, so called optical alignment method, which anisotropy is generated in the polyimide film by polarized ultra violet ray, is preferable.

In the left hand side of FIG. 2, a common metal 109, which is made from metal, is formed on the organic passivation film 108 at a position corresponding to the video signal line 12. A common voltage is applied to the common metal 109. Main roles of the common metal 109 are to decrease resistance of the common electrode 110, light shielding from back light, connecting common electrodes, which extend in stripe shapes in the lateral direction, in the longitudinal direction, and to mitigate a potential gradation in the common electrode 110 to mitigate a brightness inclination in the screen. The same material as the video signal line 12 or the scanning line 11 can be used for the common metal 109, for example, MoW (Molybdenum and tungsten alloy) or TAT (a laminated film of Ti—Al—Ti, Titanium-Aluminum-Titanium) and so forth are used.

In FIG. 2, the counter substrate 200 is disposed opposing to the TFT substrate 100 sandwiching the liquid crystal layer 300. Black matrix 202 is formed on the counter substrate 200 to cover the through hole 130 or the TFT and so forth formed on the TFT substrate 100; color filters 201 for red, green and blue are formed in the light transmitting area, namely, an image forming area. An over coat film 203 is formed over the color filters 201 and the black matrix 202; and an alignment film 204 is formed on the over coat film 203. The color filters 201 can be formed on the TFT substrate 100, which is called as COA (Color filter On Array). An alignment method of alignment film 204 is the same as explained for the alignment film 113 formed on the TFT substrate 100.

In FIG. 2, when a signal voltage is applied between the pixel electrode 112 and the common electrode 110 formed on the TFT substrate 100, lines of forces are generated as depicted by arrows, and liquid crystal molecules 301 are rotated to control a transmission of light in the pixel, consequently, images are formed.

FIG. 3 is a plan view of the pixel according to a comparative example. FIG. 3 is not a conventional example, but for comparing structure with a structure of embodiment 1, thus, novel structures may be included. In FIG. 3, the scanning lines 11 extend in the lateral direction (the x axis direction) and are arranged in the longitudinal direction (the y axis direction); the video signal lines 12 extend in the longitudinal direction (the y axis direction) and are arranged in the lateral direction (the x axis direction). In FIG. 3, a size of the pixel is 11 µm in the lateral direction and 33 µm in the longitudinal direction; a width of the video signal line 12 is approximately 2 µm and a width of the scanning line 11 is approximately 2 µm. In FIG. 3, the pixel electrode 112 is formed in an area surrounded by the scanning lines 11 and the video signal lines 12; however, since a pitch of the pixels in lateral direction is very small as 11 µm, the pixel electrode 112 overlaps with a part of the video signal line 12 and the common metal 109. In FIG. 3, the alignment direction AL of the alignment film, which determines initial alignment direction of the liquid crystal molecules 301, is in the horizontal direction, the same as the x axis direction.

In the upper portion in the y direction in FIG. 3, the TFT as a switching element is formed. The TFT in FIG. 3 corresponds to the TFT in FIG. 2. One end of the semiconductor film 102 is connected with the video signal line 12 via through hole 121. The video signal line 12 is used as a drain electrode 106. The semiconductor film 102 bends in U shape and passes under the scanning line 11 twice. Since the scanning line 11 is used as a gate electrode 104, two TFTs are formed.

Another end of the semiconductor film 102 is connected to the source electrode 107 via a through hole 122. The source electrode 107 extends in a direction to the pixel electrode 112 and is connected with the pixel electrode 112 via the through hole 130 formed in the organic passivation film 108 and the through hole 131 formed in the capacitance insulating film 111. In FIG. 3, the pixel electrode 112 is expressed by various elements, 1121, 1122, 1123, 1124, 1125 and 1126. No. 1121 is five teeth of the comb, which extend in the lateral direction from the spine 1122 of the comb, No. 1123 is a contact portion with the source electrode 107, and No. 1124 is a connection portion to connect the contact portion 1123 with the comb 1121 and 1122.

The portion which contributes to forming images is teeth portion 1121; five teeth 1121 of the comb are formed in the lateral direction (the x axis direction) from the spine 1122 of the comb in FIG. 3. The sides of the teeth 1121 which extend in the lateral direction have a certain angle with the x axis direction. That is to say, a width of the base of the tooth 1121 is larger than a width of the distal edge of the tooth 1121 to avoid a generation of a domain during a driving of the liquid crystal. The width w4 in the longitudinal direction of the tooth 1121 at the center in the x axis direction is e.g. 1.8 µm; a width w3 between the teeth is e.g. 2.5 µm. A length of the tooth 1121 in the x axis direction is e.g. 8 µm. The concave portion between the teeth 1121 at the base has an inclining portion 1126 to avoid generation of a domain.

A triangular notch 1125 is formed in the side, opposing to the adjacent pixel, of the spine 1122 at a position corresponding to the teeth 1121 of the comb to avoid generation of a domain when the liquid crystal molecules 301 are driven, and to increase a response speed.

In FIG. 3, the common electrode 110 extends in the lateral direction (the x axis direction) like a stripe with a width corresponding to a width of the teeth portion 1121 in the y axis direction of the pixel electrode 112 as avoiding the through hole 130 formed in the organic passivation film 108.

A width in the y axis direction of the common electrode 110 is e.g. 25 μm. The common electrode 110 is formed from a transparent conductive film as ITO, which has relatively low conductivity compared with a metal; in addition, the common electrode 110 is made thin to increase a transmittance, consequently, the resistance becomes further larger; thus, inclination in brightness in the screen is generated.

In FIG. 3, to avoid this phenomenon, the metal film 109 is formed overlapping the video signal line 12 in a plan view. Herein after, this metal film is called as common metal 109. The common metal 109, which is over laid by the common electrode 110, and is in common potential. In FIG. 3, a width w2 of the common metal 109 is e.g. 4 μm, while a width w1 of the video signal line 12 is e.g. 2 μm. However, the common metal 109 and the video signal line 12 are in a same width in the vicinity of the through hole 130 formed in the organic passivation film 108.

Figure 4:
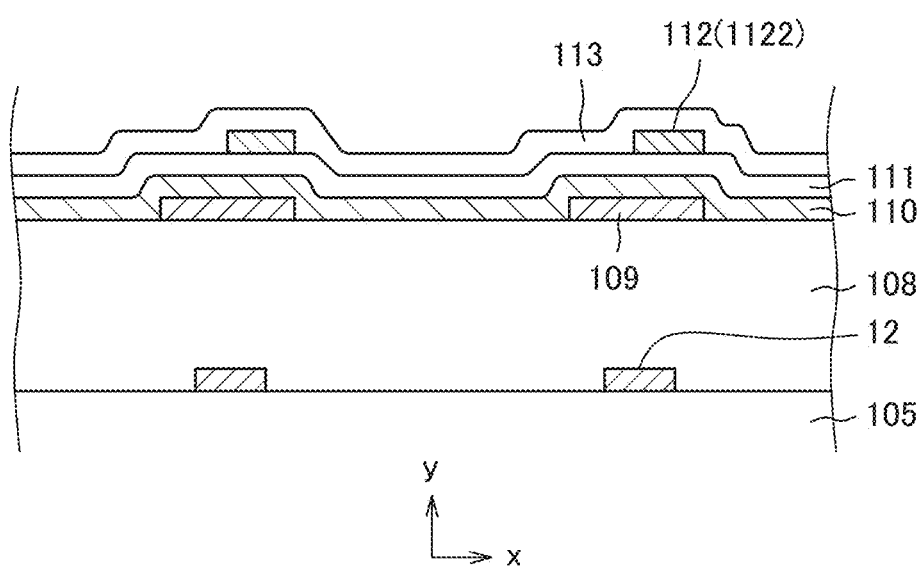
FIG. 4 is a cross sectional view of FIG. 3 along the line A-A.

FIG. 4 is a cross sectional view of FIG. 3 along the line A-A. In FIG. 4, the common metal 109 of large width is formed at a position corresponding to the video signal line 12; the common mental 109 is overlaid by the common electrode 110. The capacitance insulating film 111 is formed covering the common electrode 110. The spine 1122 of the pixel electrode 112 is formed in overlapping the common metal 109; the alignment film 123 is formed covering the pixel electrode 112 and the capacitance insulating film 111.

As shown in FIGS. 3 and 4, a transmission region in the pixel in the lateral direction (the x axis direction) is actually defined by the common metal 109. Since the common metal 109 is formed near to the liquid crystal layer 300, it has a superior light stopping effect; consequently, a contrast of images is improved.

Figure 5:
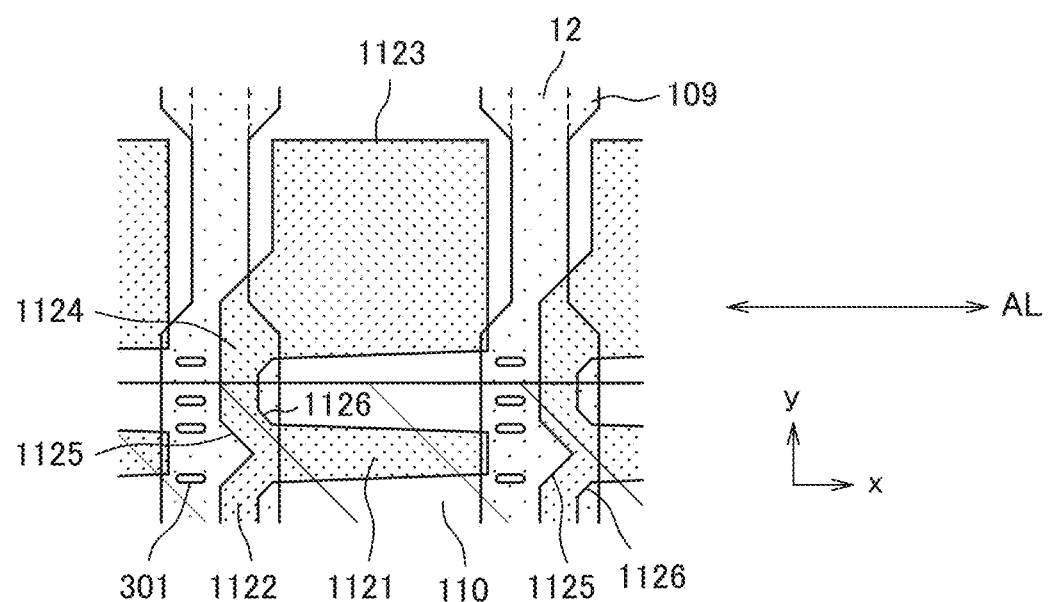
FIG. 5 is a plan view which shows directions of the liquid crystal molecules when a signal voltage is not applied to the pixel electrode.

FIG. 5 is a plan view of the contact portion 1123 and the connection portion 1124 of the pixel electrode 112. In FIG. 5, the TFT and so forth are not shown to avoid complication of the drawing. The pixel electrode 112 is shown by element numbers, 1121, 1122, 1123, 1124, 1125, 1126 and so forth. It is the same in the following drawings. In FIG. 5, the alignment direction AL of the alignment film to define an initial direction of the liquid crystal molecules 301 is in the x axis direction. Thus, the liquid crystal molecules 301 also align in the x axis direction. In the meantime, in this specification, although the invention is explained with a positive type liquid crystal molecule, which has a larger dielectric constant in the long axis than in a short axis of the liquid crystal molecule 301, when a negative type liquid crystal molecule is used, it is understood as that the driven direction of the liquid crystal molecules is rotated in 90 degrees compared with current embodiment.

Figure 6:
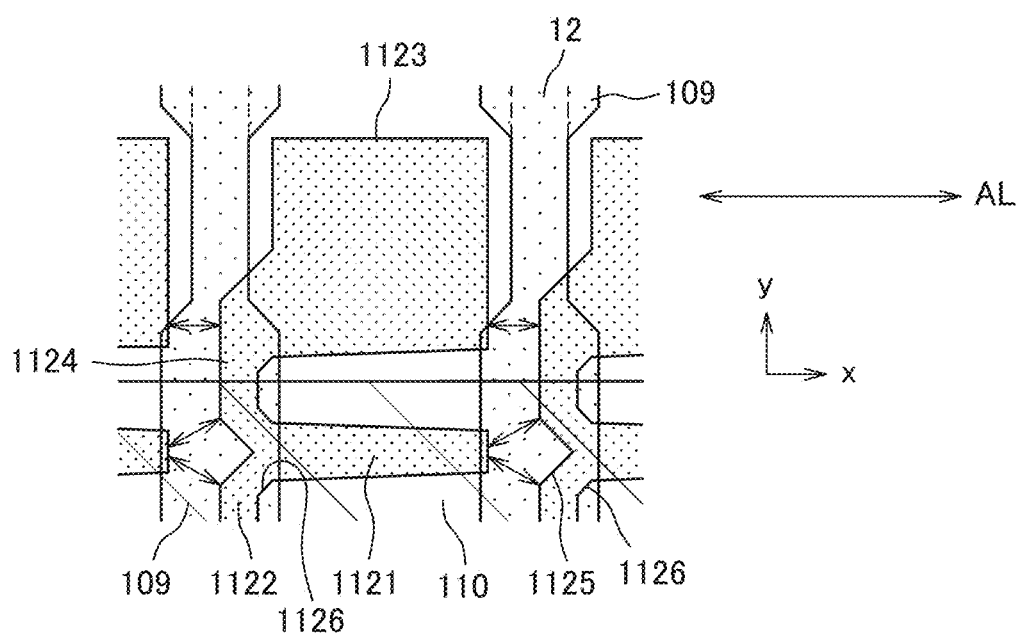
FIG. 6 is a plan view which shows an effect of adjacent pixel electrode when a signal voltage is applied to the pixel electrode.

FIG. 6 is a plan view in which a voltage is applied to the pixel electrode in FIG. 5. When a voltage is applied to the pixel electrode 112, the liquid crustal molecules 301 are driven by lines of forces between the pixel electrode 112 and the common electrode 110 as shown in FIG. 2. However, when a pitch of the pixels in the lateral direction becomes smaller in the column inversion drive, an influence from the pixel electrode in the adjacent pixel becomes a problem.

The double headed arrow in FIG. 6 show directions of the fields between the adjacent pixel electrodes 112. Since this field has an inclination with respect to the x axis direction due to effect of the notch 1125 in the comb region 1121, 1122 of the pixel electrode 112, it does not hinder the rotation of the liquid crystal molecules 301. However, in the connection portion 1124, the electric field between the two pixel electrodes 112 is parallel to the x axis direction, thus the electric field hinders a rotation of the liquid crystal molecules 301. In other words, this structure tends to generate a domain.

Figure 7:
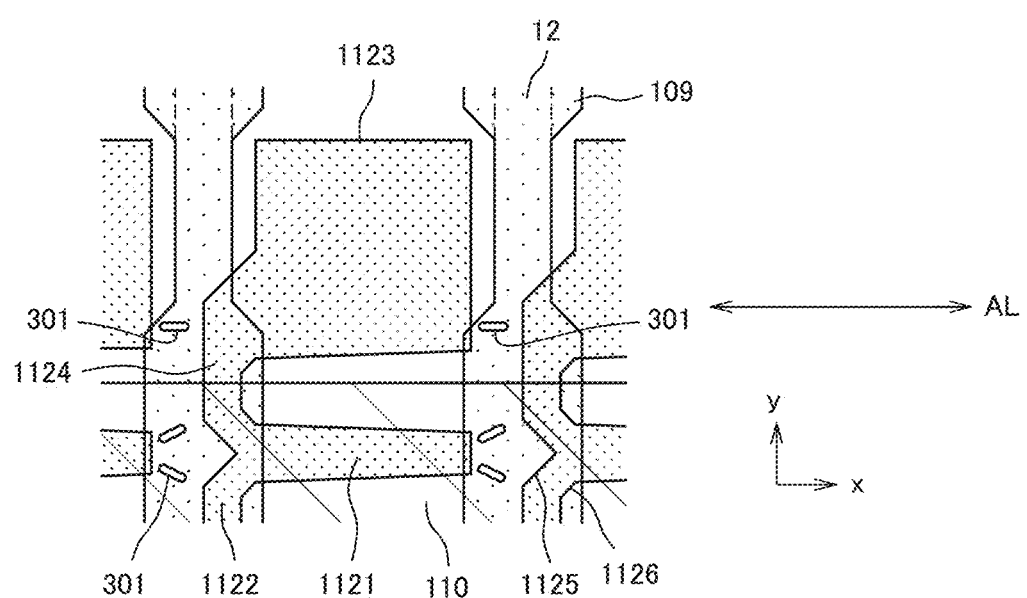
FIG. 7 is a plan view which shows alignment directions of the liquid crystal molecules corresponding to FIG. 6.

FIG. 7 is a plan view in which alignment directions of the liquid crystal molecules 301 in FIG. 6 are shown. In FIG. 7, the liquid crystal molecules 301 are shown only at the positions corresponding double arrows in FIG. 6. The liquid crystal molecules 301 tend to align with a field defined by double headed arrow.

Figure 8:
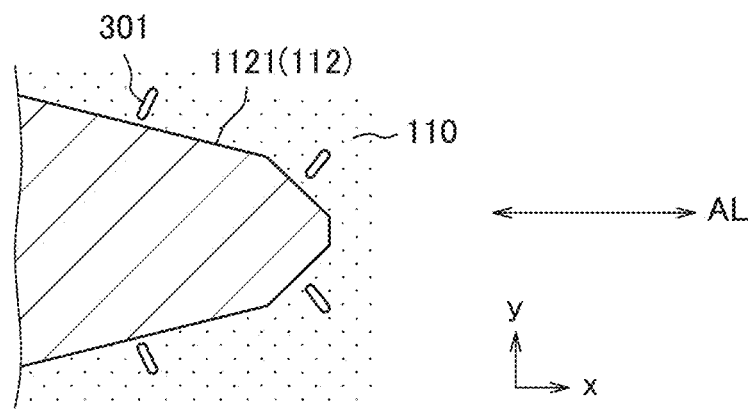
FIG. 8 is a plan view which shows alignment directions of the liquid crystal molecules by an effect between the tooth electrode of the pixel electrode and the common electrode

In the meantime, the alignment direction of the liquid crystal molecules 301 is mainly influenced by a field formed between the pixel electrode 112 and the common electrode 110. FIG. 8 is a detailed plan view of a distal edge of the tooth electrode 1121. FIG. 8 shows alignment directions of the liquid crystal molecules 301 due to electric filed formed between the pixel electrode 112 and the common electrode 110, which is shown by shading, when a voltage is applied to the pixel electrode 112. The structure of the pixel electrode 112 is designed so that the alignment directions of the liquid crystal molecules 301 due to the field formed between the pixel electrode 112 and the common electrode 110 do not coincide with the alignment direction AL of the alignment film; thus, a generation of a domain is avoided.

The alignment directions of the liquid crystal molecules 301 due to a field between the adjacent pixel electrodes in FIG. 7 do not contradict to the alignment directions of the liquid crystal molecules 301 due to a field formed between the pixel electrode 112 and the common electrode 110 in FIG. 8 but coincide with that. Thus, a generation of a domain can be avoided in this area.

Figure 9:
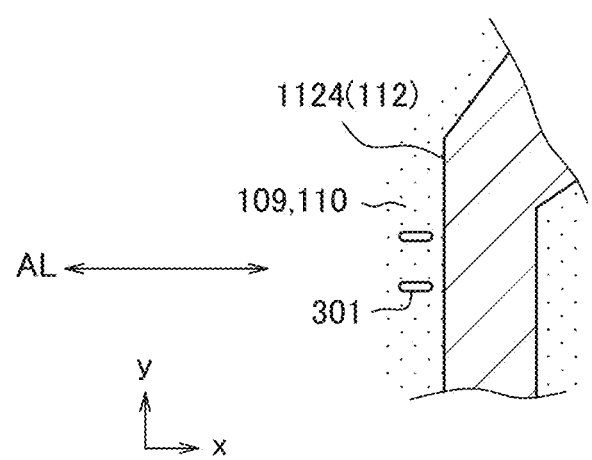
FIG. 9 is a plan view which shows alignment directions of the liquid crystal molecules by an effect between the connection portion of the pixel electrode and the common electrode.

FIG. 9 is a plan view which shows alignment directions of the liquid crystal molecules 301 due to electric fields formed between the pixel electrode 112 and the common electrode 110, which is shown by shading, in the connection portion 1124 of the pixel electrode 112 when a voltage is applied to the pixel electrode 112. In the connection portion 1124 of the pixel electrode 112, the alignment direction AL of the alignment film is the same as the alignment direction of the liquid crystal molecules 301 formed between the pixel electrode 112 and the common electrode 110; thus, this structure tends to generate a domain.

The alignment direction of the liquid crystal molecules 301 due to a field between the adjacent pixel electrodes 112 in the connection portion 1124 of the pixel electrode 112 shown in FIG. 7 is the same as the alignment direction AL of the alignment film, which tends to generate a domain; this effect is the same as alignment effect due to the field between the pixel electrode 112 and the common electrode 110 explained in FIG. 9. That is to say, as explained in FIG. 7 and FIG. 9, both fields formed between the pixel electrode 112 and the common electrode 110 in FIG. 9 and formed between the adjacent two pixel electrodes 112 in FIG. 9 tend to generate a domain.

In the meantime, since most of the connection portion 1124 overlaps the common metal 109, which is a light shading film, it does not contribute to a light transmission of the pixel. However, the liquid crystal can be thought as an elastic body, thus, the alignments of the liquid crystal molecules 301 in the area shaded by the common metal 109 influences the alignments of the liquid crystal molecules 301 in the transmission area of the pixel. That is to say, if a direction of rotation of the liquid crystal molecules 301 in the light transmission area and a direction of rotation of the liquid crystal molecules 301 in the light shading area are the same, the liquid crystal molecules 301 can rotate quickly. On the other hand, in the structure that the liquid crystal molecules 301 does not rotate even a voltage is applied to the pixel electrode 112 in the light shading area, a rotation of the liquid crystal molecules 301 in the transmission area becomes slow influenced by the liquid crystal molecules 301, which do not rotate, in the light shading area; in other words, a response of the liquid crystal molecules 301 becomes slow.

Figure 10:
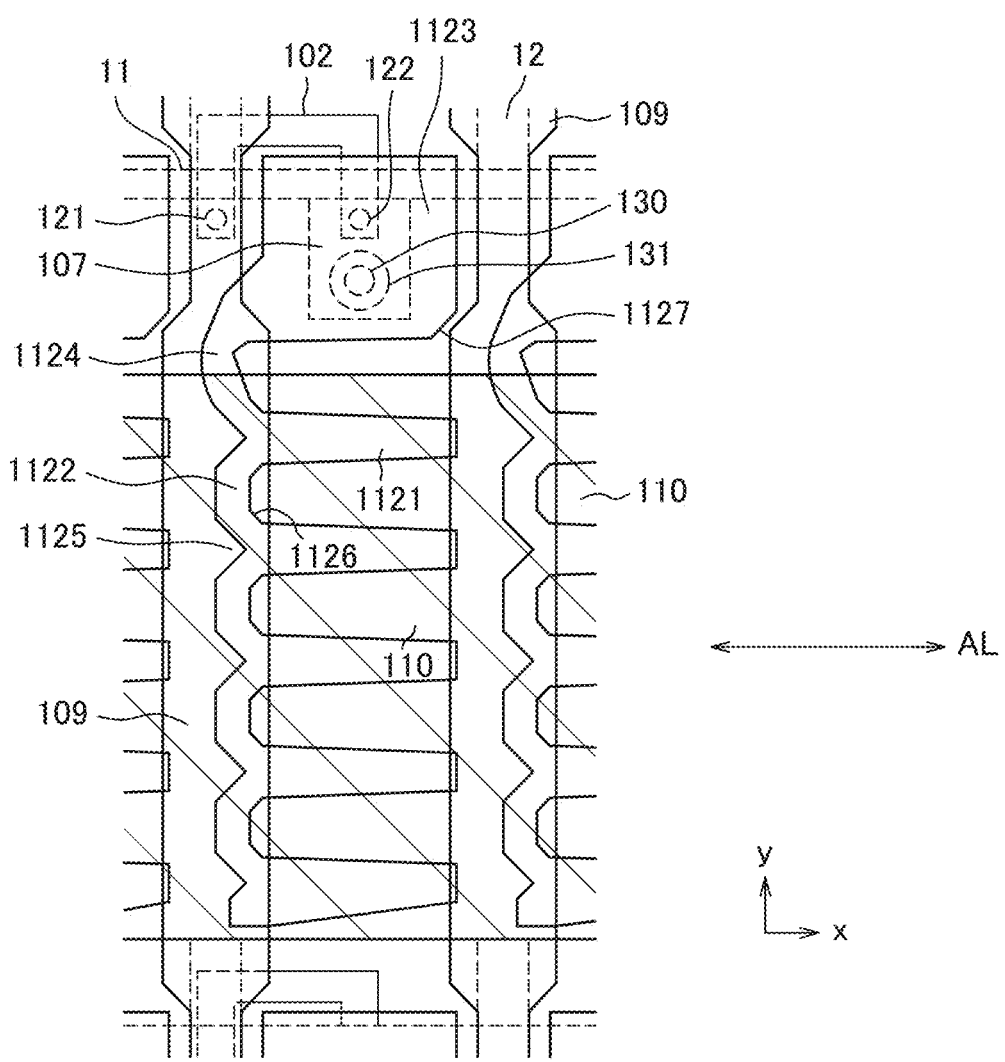
FIG. 10 is a plan view of a pixel according to embodiment 1.

FIG. 10 is a plan view of the pixel electrode of embodiment 1, which counter measure the above explained problem.

In FIG. 10, the alignment direction AL of the alignment film, which defines an initial alignment direction of the liquid crystal molecules 301, is in the horizontal direction (the x axis direction). FIG. 10 differs from FIG. 3 in the structure of the connection portion 1124 and the contact portion 1123 of the pixel electrode 112. In FIG. 10, the connection portion 1124 of the pixel electrode 112 curves toward the adjacent pixel so that the normal of the curved portion 1124 in the initial alignment direction AL of the alignment film becomes as less as possible. It is preferable that the outer side of the connection portion 1124, namely a side toward the adjacent pixel electrode, has an area which has a normal line tilting 30 degrees or more with respect to the horizontal direction.

The connection portion 1124 overlaps the common metal 109 and video signal line 12, in addition, protrudes toward the adjacent pixel electrode 112 than a center line of the video signal line 12 in a direction of the x axis. Further, the connection portion 1124 curves protruding toward the adjacent pixel electrode 112 compared with a spine 1122 of the comb electrode. Thus, normal of the side of the connection portion 1124 can have larger inclining angle with the x axis direction which is an intimal alignment direction AL. As a result, a region, in which the liquid crystal molecules 301 do not rotate even when a voltage is applied to the pixel electrode 112, namely a generation of a domain, can be avoided. At the same time, a response delay of the liquid crystal molecules 301 due to the domain can be mitigated.

In FIG. 10, the contact portion 1123, which is approximately rectangle, of the pixel electrode 112 has a cutout 1127 at a corner in the lower portion in the y axis direction to avoid the protruding portion of the connection portion 1124 of the adjacent pixel electrode 112. The side of the cutout 1127 has an angle of 30 degrees or larger with respect to the x axis direction and the y axis direction. In addition, a lower side of the contact portion 1123 has an angle θ with respect to the x axis direction (see FIG. 14).

In the pixel electrode 112 explained above, elements may be called as follows: teeth portion 1121, a spine portion 1122, a notch portion 1125, a first portion including an inclining portion 1126, a second portion including contact portion 1123, and a third portion including the connection portion 1124. Alternatively, the first portion is defined as a portion including the teeth electrode 1121; that is to say, the teeth electrode 1121 has an essential effect in the first portion.

Figure 11:
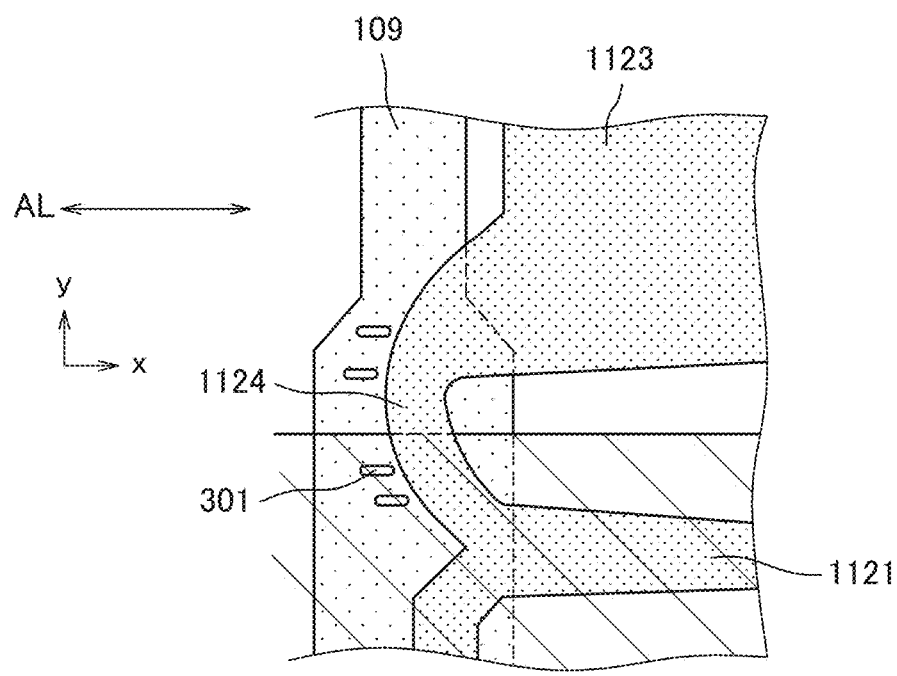
FIG. 11 is a plan view of alignment direction of the liquid crystal molecules without an influence of the pixel electrode in adjacent pixel when the signal voltage is not applied in the vicinity of the connection portion of the pixel electrode.

FIG. 11 is a plan view in which a voltage is not applied to the pixel electrode 112 (1123, 1124). The shapes of the contact portion 1123 and the connection portion 1124 are the same as explained in FIG. 10. In FIG. 11, since the alignment direction AL of the alignment film is in the horizontal direction (the x axis direction), the liquid crystal molecules 301 align in the horizontal direction.

Figure 12:
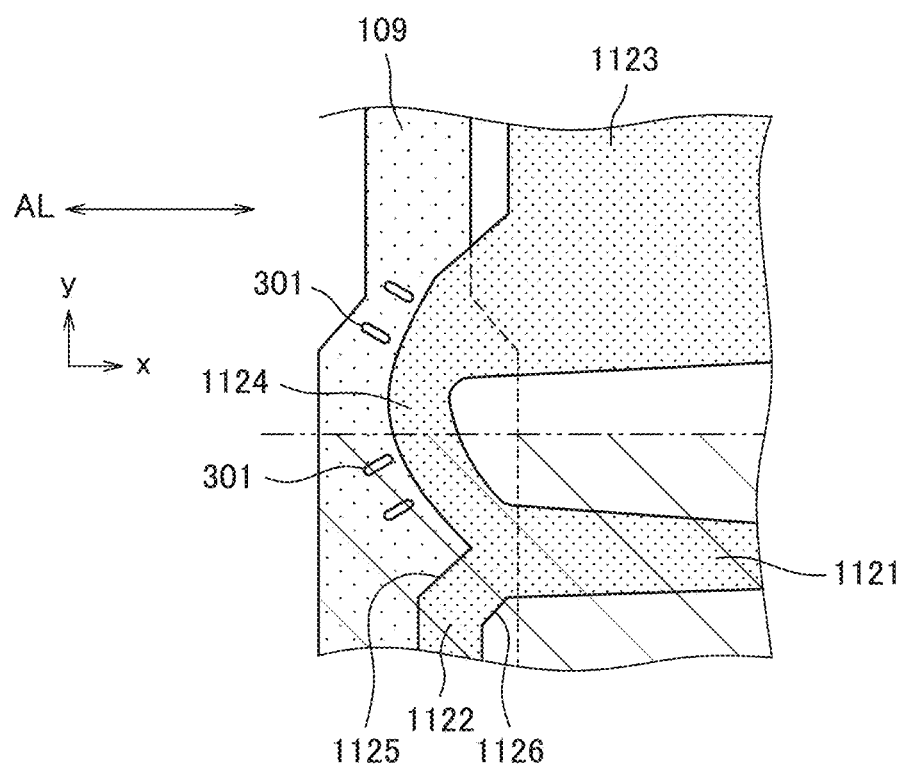
FIG. 12 is a plan view of alignment directions of the liquid crystal molecules without an influence of the pixel electrode in adjacent pixel when the signal voltage is applied in the vicinity of the connection portion of the pixel electrode.

FIG. 12 is a plan view which shows alignment directions of the liquid crystal molecules 301 in the vicinity of the connection portion 1124 of the pixel electrode 112 when a voltage is applied to the pixel electrode 112. FIG. 12 shows behavior of the liquid crystal molecules 301 due to a field formed between the pixel electrode 112 and the common electrode 110 (or the common metal 109). When a voltage is applied between the pixel electrode 112 and the common electrode 100, the lines of forces are generated as depicted in FIG. 2, then, the liquid crystal molecules 301 align. If the connection portion 1124 of the pixel electrode 112 is the shape of FIG. 11 or 12, the liquid crystal molecules can rotate, thus, generation of the domain can be avoided.

Figure 13:
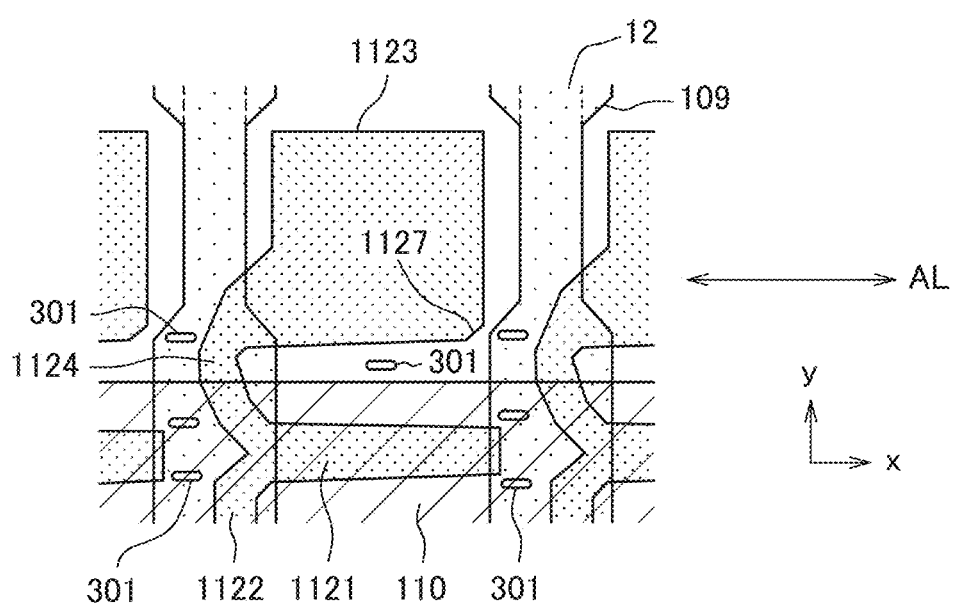
FIG. 13 is a plan view of alignment directions of the liquid crystal molecules when the signal voltage is not applied in the vicinity of the connection portion of the pixel electrode of FIG. 10.
Figure 14:
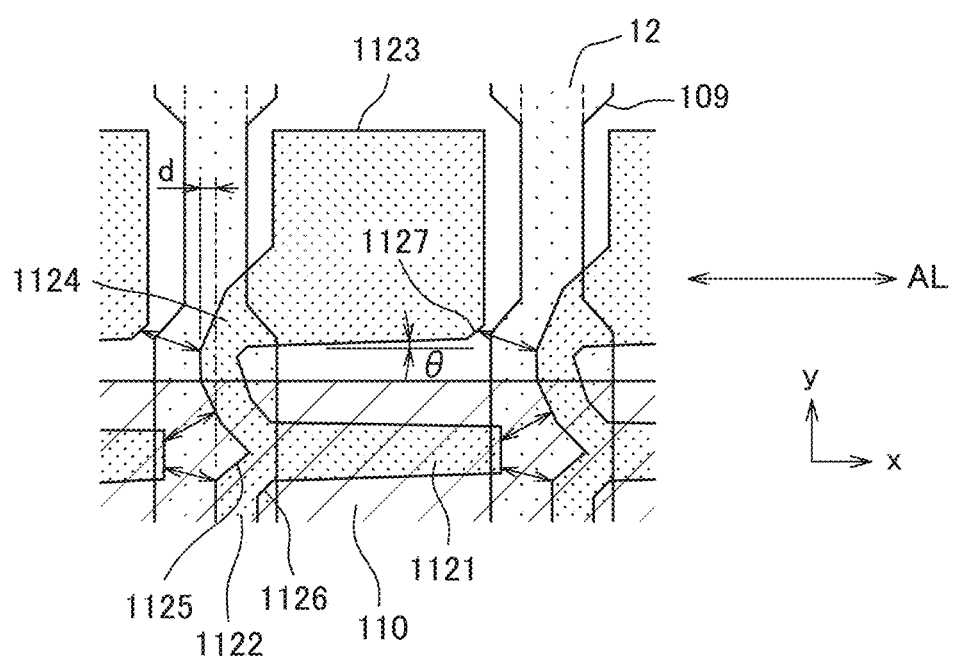
FIG. 14 is a plan view to show effects between the pixel electrodes in the vicinity of the connection portion of the pixel electrode of FIG. 10 when the signal voltage is applied.
Figure 15:
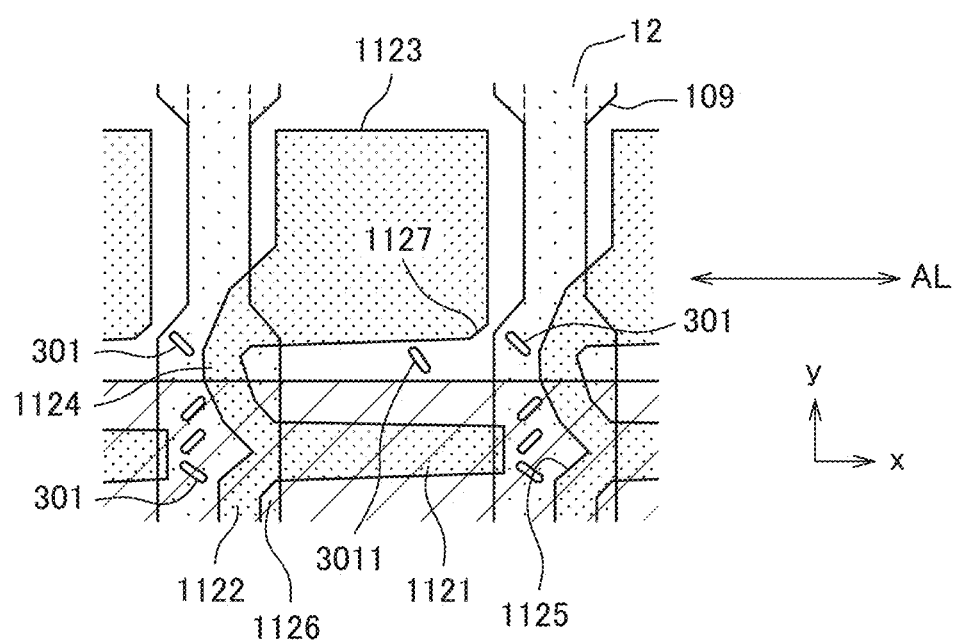
FIG. 15 is a plan view to show alignment directions of the liquid crystal molecules corresponding to FIG. 14.

FIGS. 13 to 15 are plan views of the connection portion 1124 and the contact portion 1123 of the pixel electrode 112 which show effects of the electric field between the adjacent pixel electrodes 112. FIG. 13 is a plan view in which a voltage is not applied between the pixel electrodes 112. In FIG. 13, the liquid crystal molecules 301 align in the horizontal direction (the x axis direction), which is the same direction of alignment direction AL of the alignment film.

FIG. 14 is a plan view to show the effects when a voltage is applied to the pixel electrode 112 (1123, 1124). In FIG. 14, the double headed arrows show the fields between the adjacent pixel electrodes 112 when a signal voltage is applied to the pixel electrode 112 (1123, 1124). The voltage between the adjacent pixel electrodes 112 is twice the voltage between the pixel electrode 112 and the common electrode 110 in the column inversion drive.

In FIG. 14, the connection portion 1124 curves protruding toward the adjacent pixel electrode 112 than a center line of the video signal line 12 in a direction of the x axis so that normal does not coincident with the horizontal direction (the x axis direction). Further, the connection portion 1124 curves protruding toward the adjacent pixel electrode compared with a spine 1122 of the pixel electrode 112. In FIG. 14, an amount which the connection portion 1124 protrudes toward the adjacent pixel electrode 112 is d. The protruding amount d is defined as a distance between the spine 1122 and the distal edge of the curved portion of the connection portion 1124 in the x axis direction. That is to say, the electrode structure in FIG. 14 increases area in which field does not coincide with the horizontal direction (the x axis direction) between the adjacent pixel electrodes 112, thus, enables the liquid crystal molecules 301 can rotate in this area.

In the meantime, when a distance between the connection portion 1124 and the pixel electrode 112 in the adjacent pixel becomes extremely small, an irregular field is generated and may cause a malfunction in the alignment of the liquid crystal molecules 301. To avoid this problem, in the structure of FIGS. 10 to 15, the corner of the contact portion 1123 of the pixel electrode 112 has a cutout 1127 like chamfer is formed. The normal of the cutout 1127 like chamfer includes an intersection angle of 30 degrees or more with respect to the lateral direction (the x axis direction) or the longitudinal direction (the y axis direction).

Another feature of the contact portion 1123 of the pixel electrode 112 in FIG. 14 is that the bottom side in the y direction has an intersecting angle θ with respect to the x axis direction. In FIG. 14, since the common electrode 110 does not exist under the contact portion 1123, the fringe field between the contact portion 1123 and the common electrode 110 does not exist; however, there exists a field between the bottom side of the contact portion 1123 and the top side of the common electrode 110. This field is weaker than the field in the other area; however, when a distance between the common electrode 110 and the contact portion 1123 becomes smaller, a certain influence is generated. In FIG. 14, the bottom side of the contact portion 1123 has angle θ with respect to the x axis direction, as a result, a rotation of the liquid crystal molecules 301 is not hindered.

FIG. 15 is a plan view which shows alignments of the liquid crystal molecules 301 with a field between the adjacent pixel electrodes 112 when a voltage is applied to the pixel electrode 112. As shown in FIG. 15, the alignment directions of the liquid crystal molecules 301 due to a field between the adjacent pixel electrodes 112 have certain angles with respect to the horizontal direction (the x axis direction); thus, a domain is not likely to be generated. In addition, the alignment direction of the liquid crystal molecules 301 caused by the effect between the adjacent pixel electrodes 112 in FIG. 15 approximately coincides with the alignment direction of the liquid crystal molecules 301 caused by the pixel electrode 112 and the common electrode 110 in FIG. 12; and both have effect that a domain is not likely be generated. As a result, an effect to decrease a response speed of the liquid crystal molecules 301 in the transmission area of the pixel is not generated.

In the meantime, the liquid crystal molecules 3011 have alignment directions different from the longitudinal direction (the y axis direction). The effect in this area is caused by a field in plane direction between the contact portion 1123 and the common electrode 110, not the field between the adjacent pixel electrodes, thus, influence is smaller to the alignments of the liquid crystal molecules 301 than in other areas. However, even in this area, if the effect to hinder a rotation of the liquid crystal molecules 301 does not exist, it has a good effect to avoid a decrease in response speed in the transmission area.

The portions of the pixel electrode 112 explained above is not in the transmission area of the pixel. However, even in a non-transmission area, if a generation of the region in which the liquid crystal molecules 301 cannot rotate is avoided, a generation of a domain can be suppressed and a decrease in response speed of the liquid crystal molecules 301 in the transmission area can be avoided because the liquid crystal is an elastic body.

As explained above, the present invention is especially effective when a pitch of the pixels is small. The pitch of the pixels in the lateral direction (the x axis direction) is 11 μm in embodiment 1; however, the present invention is specifically effective in the structure when a pixel pitch is 20 μm or less.

According to the present invention, a decrease in response speed due to interference between the adjacent pixel electrodes can be avoided even a pixel pitch is made smaller. Therefore, a liquid crystal display device having a high definition and a high response speed can be realized.

What is claimed is:

1. A liquid crystal display device comprising:
  scanning lines extending in a first direction and being arranged in a second direction,
  video signal lines extending in the second direction and being arranged in the first direction, and
  a pixel being surrounded by the scanning lines and the video signal lines,
  wherein a pixel electrode is formed in the pixel,
  the pixel electrode includes a first portion including comb electrode, a second portion including contact portion to receive electrical signal, and a third portion,
  the third portion protrudes toward an adjacent pixel electrode compared with the first portion and the second portion,
  a normal of a side toward the adjacent pixel electrode of the third portion intersects with the first direction and the second direction with an angle other than 0 and 90 degrees, and
  the third portion of the pixel electrode overlaps the video signal line.

2. The liquid crystal display device according to claim 1, wherein the side toward the adjacent pixel electrode of the third portion is a curved line.

3. The liquid crystal display device according to claim 1, wherein the normal of the side toward the adjacent pixel electrode of the third portion intersects with the first direction and the second direction with an angle of 30 degrees or more.

4. The liquid crystal display device according to claim 1, wherein a metal film applied with a common voltage extends in the second direction overlapping the video signal line, and
  a width of the metal film in the first direction is larger than a width of the video signal line in the first direction.

5. The liquid crystal display device according to claim 1, wherein a width of the light transmission area in the first direction of the pixel is defined by the metal film.

6. The liquid crystal display device according to claim 4, wherein a width of the metal film in the first direction at a region corresponding to the second portion of the pixel electrode is smaller than a width of the metal film in the first direction at a region corresponding to the first portion of the pixel electrode.

7. The liquid crystal display device according to claim 4, wherein the third portion of the pixel electrode overlaps the metal film.

8. The liquid crystal display device according to claim 1, wherein the side of the third portion of the pixel electrode protrudes toward to the adjacent pixel electrode than a center of the video signal line in the first direction.

9. The liquid crystal display device according to claim 1, wherein one region of the third portion of the pixel electrode overlaps the common electrode and another region of the third portion of the pixel electrode does not overlap the common electrode, and
  the second portion of the pixel electrode does not overlap the common electrode.

10. The liquid crystal display device according to claim 1, wherein the second portion of the pixel electrode is approximately rectangle, and
  a chamfer like cutout is formed at a corner of a side, opposing to a side in which the third portion connects, of the second portion of the pixel electrode.

11. The liquid crystal display device according to claim 10, wherein the cutout includes a side whose normal has a intersecting angle of 30 degrees or more with the first direction.

12. The liquid crystal display device according to claim 1, wherein the second portion of the pixel electrode is approximately rectangle, and a side of the second portion opposing to the first portion of the pixel electrode has an intersecting angle other than 0 degrees with the first direction.

13. The liquid crystal display device according to claim 1, wherein a pitch of the pixels in the first direction is 20 μm or less.

* * * * *